United States Patent [19]

Fiorina et al.

[11] Patent Number: 5,221,862
[45] Date of Patent: Jun. 22, 1993

[54] A.C. ELECTRICAL POWER SUPPLY SYSTEM INCLUDING A BACKUP POWER SUPPLY EQUIPPED WITH AN INVERTER OPERATING IN REVERSIBLE MODE

[75] Inventors: Jean-Noël Fiorina, Seyssinet-Pariset; Patrick Tenaud, Voreppe, both of France

[73] Assignee: Merlin Gerin, Meylan, France

[21] Appl. No.: 765,057

[22] Filed: Sep. 24, 1991

[30] Foreign Application Priority Data

Oct. 8, 1990 [FR] France .............. 90 12475

[51] Int. Cl.$^5$ .............................................. H02J 9/06
[52] U.S. Cl. ............................................ 307/66; 307/87
[58] Field of Search ................ 307/64, 66, 85, 86, 307/87

[56] References Cited

U.S. PATENT DOCUMENTS

| 4,238,691 | 12/1980 | Ebert, Jr. ............................ 307/66 |
| 4,366,390 | 12/1982 | Rathmann ........................... 307/66 |
| 4,807,102 | 2/1989 | Serras-Paulet ...................... 307/64 |
| 5,010,469 | 4/1991 | Bobry .................................. 307/66 |

FOREIGN PATENT DOCUMENTS

| 0019932 | 12/1980 | European Pat. Off. . |
| 0200656 | 11/1986 | European Pat. Off. . |
| 2577728 | 8/1986 | France . |
| 8001443 | 7/1980 | PCT Int'l Appl. . |
| 2137033 | 9/1984 | United Kingdom . |

Primary Examiner—Jeffrey A. Gaffin
Attorney, Agent, or Firm—Parkhurst, Wendel & Rossi

[57] ABSTRACT

A first control loop enables the inverter to be made to operate as a current generator when it recharges the batteries of a back-up power supply. Two other control loops enable the inverter to compensate on the one hand the harmonics, and on for other hand for the reactive part of the current absorbed by the load, when the inverter is on stand-by.

8 Claims, 1 Drawing Sheet

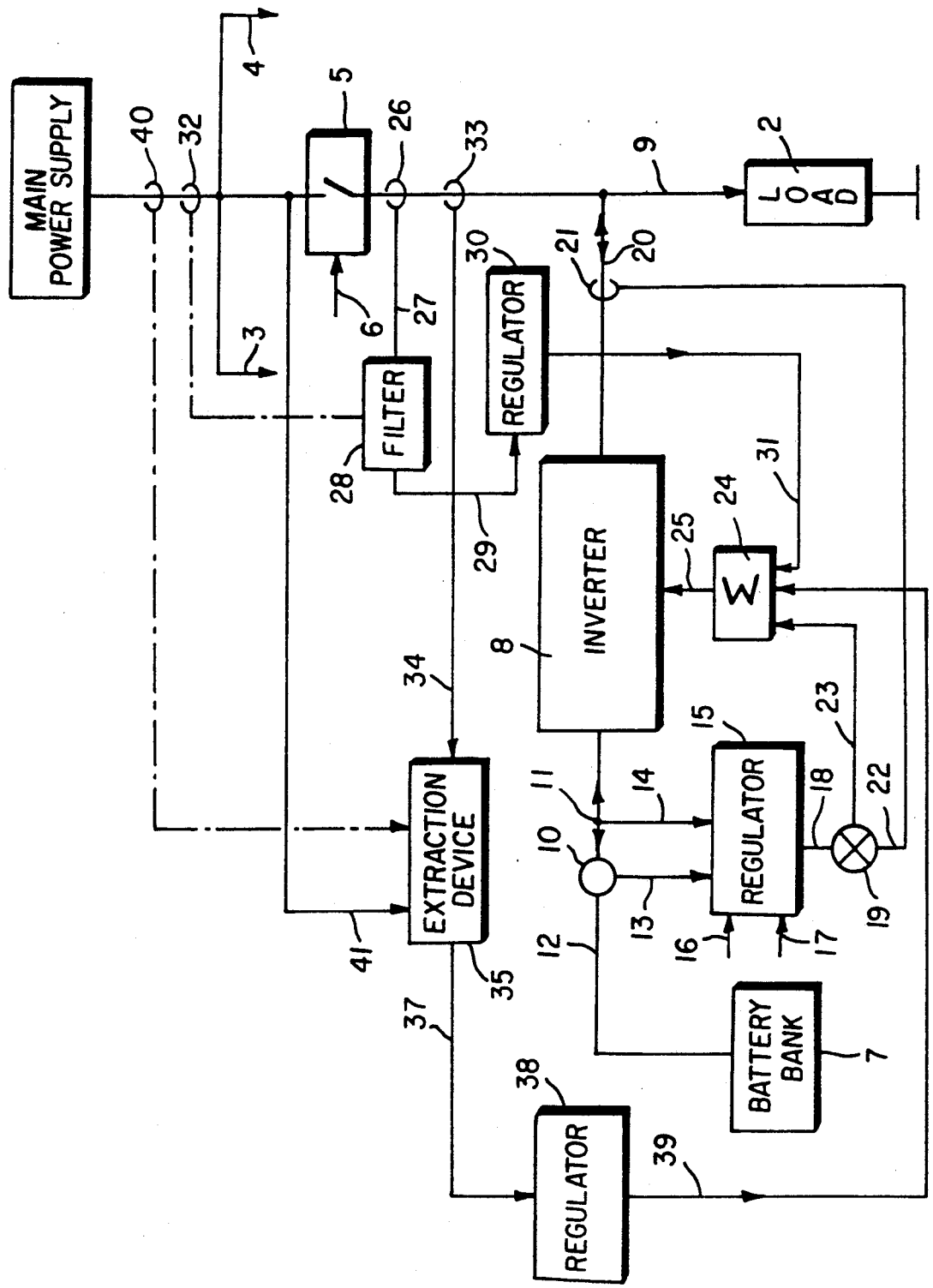

A.C. ELECTRICAL POWER SUPPLY SYSTEM INCLUDING A BACKUP POWER SUPPLY EQUIPPED WITH AN INVERTER OPERATING IN REVERSIBLE MODE

BACKGROUND OF THE INVENTION

The present invention relates to an AC electrical power supply system, comprising a back-up power supply equipped with an inverter operating in reversible mode.

It is state of the art to equip a system supplying power to a load with a back-up power supply capable of provisionally replacing the main power supply, whether it be single or multi-phase, in the event of failure of the latter. This back-up power supply uses the power supplied by a bank of batteries. This battery bank supplies a reversible inverter which operates, in both directions, as a voltage generator. In the event of a mains power supply failure, the load is automatically disconnected by a static contactor provided for this purpose, and it is then the back-up power supply which supplies, via its inverter, the AC electrical power to this load. The inverter being energized in reversible mode, it is via the latter that the battery is recharged by the mains power supply when, everything having reverted to normal, it is again supplying the load.

In systems of this kind, a dephasing inductance is generally connected between the above-mentioned static contactor and the load, in order to obtain an inverter current and voltage in phase, when the batteries are recharged via the reversible inverter (U.S. Pat. Nos. 4,673,825, and 4,238,691). This solution has the drawbacks of both increasing the cost price of the system, and of causing a relatively high current to flow in the inverter when, being on stand-by, its only function is to act as the battery recharging circuit.

SUMMARY OF THE INVENTION

The object of the invention is to overcome these drawbacks. It relates for this purpose to an a system to supply AC electrical power to a load from the mains power supply, the system comprising an auxiliary back-up power supply equipped with a bank of rechargeable batteries and a reversible inverter, with means for recharging the batteries, by the mains power supply and via the reversible inverter, when the mains power supply supplies the load normally, and wherein the system is equipped with means for the inverter to take from this mains power supply, when the mains power supply is operating normally and is supplying the load, an active current whose amplitude is proportional to the direct current then necessary to recharge the batteries, so that the inverter operates as a current generator when, being on stand-by, it is used to recharge the batteries.

The system can moreover be advantageously equipped with means for compensating harmonics designed, when the inverter is on stand-by, to cancel out the harmonics of the current supplied to the load by the mains power supply, the inverter supplying the load with the harmonics it absorbs.

The same system can also advantageously be equipped with means for compensating the reactive part designed, when the inverter is on stand-by, to cancel out the reactive part of the current supplied to the load by the mains power supply, the inverter supplying the load with the reactive part of the current it absorbs.

BRIEF DESCRIPTION OF THE DRAWING

The invention will be easily understood, and its advantages and other features will become more clearly apparent from the following description of an illustrative embodiment of the invention, given as a non-restrictive example only, referring to the accompanying drawing whose single FIGURE represents a block diagram of this installation, in single-phase current in this example.

DESCRIPTION OF THE PREFERRED EMBODIMENT

Referring to the FIGURE, reference numeral 1 designates the input line of an AC mains supply, assumed here to be single-phase essentially to simplify the drawing, supplying electrical power to a load 2, and other users 3 and 4.

Between the single-phase mains 1 and this load 2 there is located a static contactor 5 controlled at 6 by signals from a central measuring, computing and control device (not represented), in order to disconnect the load 2 from the mains supply in the event of failure of the latter. In this case, the static contactor 5 is kept open by the signal at 6, and the load 2 is then provisionally supplied by a back-up power supply comprising a bank of batteries 7 and a reversible inverter 8.

When the system operates normally, the static contactor 5 is kept closed, and the mains system 1 not only supplies the load 2 via the line 9, but also recharges the bank of batteries 7, via the reversible inverter 8 whose chopping strategy is suitably adjusted.

According to a first feature of the invention, this inverter 8, which in the event of a failure of the mains supply operates as a voltage generator supplying the load 2, is made to operate as a current generator when, the mains 1 being present normally and supplying the load, it is used to recharge the battery 7 bank. This result is obtained by making the inverter 8 take, from the line 9 connecting the mains supply to the load, i.e. in fact from the mains supply 1, an active current whose amplitude is proportional to the DC current then necessary to recharge the battery 7 bank.

For this purpose, a DC current sensor 10 and a DC voltage measuring point 11 are provided on the input-/output wire 12 of the battery 7 bank, and this charging current and voltage data is applied respectively at 13 and 14 to an electronic regulator 15, which in addition receives at 16 and 17 the battery charging current and voltage references generated by the above-mentioned central control device.

This regulator 15 consequently provides, on a first input 18 of a comparator 19, an input AC current setpoint of the inverter 8, which is compared with a real input current taken from the input/output conductor 20 of the inverter by a current transformer 21 and applied to the second input 22 of this comparator 19.

The output 23 of this comparator 19 is applied, via a summer 24 whose role will become apparent hereafter, to a control input 25 of the inverter 8, in order to modify its chopping strategy accordingly.

According to another feature of the invention, this same chopping strategy is furthermore modified so that the inverter inputs, via the conductor 20, to the line 9, a current such that the mains only has to supply the fundamental component of the AC current absorbed by the load, the inverter supplying the current harmonics absorbed by the load.

For this purpose, the mains current is taken off at 26, downline from the static contactor 5, by a current transformer, and is applied at 27 to a high-pass filter 28 capable of rejecting the fundamental component of this current and of letting all its harmonics pass. The output 29 of this filter is applied to an electronic regulator 30 whose transfer function is determined to apply, via its output 31, the summer 24, and above-mentioned input 25, modification signals to the inverter 8 of its chopping strategy tending to cancel out the harmonics of the mains current taken at 26. The inverter supplies the harmonics it absorbs to the load 2, via the conductor 20 and line 9, the mains input line 1 supplying only the fundamental component of the current. Control of the inverter is thus included in a lock-loop designed to cancel out the harmonics of the current in the mains power supply input line 1.

As an alternative embodiment, the current sensor can be placed at 32, upline from the static contactor 5, and the device then serves the purpose of depolluting the mains power supply input line 1, for it then also eliminates the current harmonics of the mains power supply which are due to other users.

According to yet another feature of the invention, this chopping strategy is also modified so that the inverter 8 inputs to the line 9, via the conductor 20, a current such that the mains power supply 1 only has to supply the active part of the current absorbed by the load, the inverter supplying the reactive part of the current absorbed by the load. The mains power supply then sees the load 2 as "cos. $\phi = 1$".

To this end, the mains power supply current is taken downline from the static contactor 5 by a current transformer 33, and is applied at 34 to a device 35 for extracting the dephased current/voltage part (i.e. the reactive part of the current), which receives on its other input 41 data representative of the corresponding voltage, taken at 36 on the line 1. The output 37 of this extraction device is applied to an electronic regulator 38 whose transfer function is determined to apply, via its output 39, the summer 24, and again the input 25, modification signals to the inverter 8 of its chopping strategy tending to cancel out the reactive part of the mains supply current taken at 33. The inverter supplies to the load 2, via the conductor 20 and line 9, the reactive part of the current it absorbs. Control of the inverter is thus included in a lock-loop designed to cancel out the reactive part of the current in the mains supply input line 1.

As an alternative embodiment, this current sensor can be placed at 40, upline from the static contactor 5, so that the inverter 8 also acts as a cos. $\phi$ compensator, for it also compensates the reactive part of the current due to other users.

The invention is naturally in no way limited to the embodiment particularly described above, and can be applied for example equally well to a multiphase power supply. In a more general manner, it also covers other equivalent embodiments, whether they be more sophisticated or less so.

We claim:

1. A system to supply AC electrical power to a load from a mains power supply, said system comprising an auxiliary back-up power supply equipped with a bank of rechargeable batteries and a reversible inverter, circuit means for recharging the batteries by the mains power supply and via the reversible inverter, when the mains power supply supplies the load normally, wherein the inverter takes from the mains power supply, when the mains power supply is operating normally and is supplying the load, an active current whose amplitude is proportional to the direct current then necessary to charge the batteries, so that the inverter operates as a current generator when used to recharge the batteries.

2. The system according to claim 1, wherein said circuit means comprises means for measuring the direct current supplied by the inverter to the battery, means for measuring the DC voltage at the battery terminals, a first electronic regulator comprising inputs connected respectively to the means for measuring the DC current and DC voltage of the battery, and inputs to which battery charging current and voltage reference values are applied, the output of the first regulator being applied to a first input of a comparator a second input of which is connected to means for measuring the current supplied to the inverter by the mains power supply, the output of the comparator being connected to a control input of the inverter.

3. The system according to claim 1, further comprising means for compensating harmonics designed, when the inverter is on stand-by, to cancel out the harmonics of the current supplied to the load by the mains power supply, the inverter supplying the load with the harmonics it absorbs.

4. The system according to claim 3, wherein the means for compensating harmonics comprise a highpass filter whose input is connected to means for measuring the current supplied to the load by the mains power supply, and a second electronic regulator whose input is connected to the output of the highpass filter and whose output is connected to a control input of the inverter.

5. The system according to claim 4, wherein the means for measuring the current supplied to the load comprise a sensor which is placed sufficiently upline on the mains power supply for the inverter to also eliminate the current harmonics of the mains power supply which are due to other users.

6. The system according to claim 1, means for compensating the reactive part designed, when the inverter is on stand-by, to cancel out the reactive part of the current supplied to the load by the mains power supply, the inverter supplying the load with the reactive part of the current it absorbs.

7. The system according to claim 6, wherein the means for compensating the reactive part comprises a device for extracting the reactive part connected to second means for measuring the current supplied to the load by the mains power supply, and means for measuring the voltage of the mains power supply, the output of the extraction device being connected to a third electronic regulator whose output is connected to a control input of the inverter.

8. The system according to claim 7, wherein the second means for measuring the current comprises a sensor which is placed sufficiently upline on the mains power supply for the inverter to operate as a cos $\phi$ compensator.

* * * * *